United States Patent
Lee et al.

(10) Patent No.: US 10,014,497 B2
(45) Date of Patent: Jul. 3, 2018

(54) POUCH-TYPE SECONDARY BATTERY INCLUDING SEALED PART HAVING RECESS

(71) Applicant: LG CHEM, LTD., Seoul (KR)

(72) Inventors: Jin Soo Lee, Daejeon (KR); Joo Hwan Sung, Daejeon (KR); Sung Pil Yoon, Daejeon (KR); Seong Min Kim, Daejeon (KR); Jung Koo Kang, Daejeon (KR); Ju Bin Kim, Daejeon (KR); Hae Jin Lim, Daejeon (KR); Seunghe Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/116,865

(22) PCT Filed: Feb. 10, 2015

(86) PCT No.: PCT/KR2015/001310
§ 371 (c)(1),
(2) Date: Aug. 5, 2016

(87) PCT Pub. No.: WO2015/122667
PCT Pub. Date: Aug. 20, 2015

(65) Prior Publication Data
US 2017/0170437 A1    Jun. 15, 2017

(30) Foreign Application Priority Data
Feb. 14, 2014  (KR) .................. 10-2014-0017281

(51) Int. Cl.
*H01M 2/08*   (2006.01)
*H01M 2/06*   (2006.01)
(Continued)

(52) U.S. Cl.
CPC ....... *H01M 2/0275* (2013.01); *H01M 2/0212* (2013.01); *H01M 2/0287* (2013.01); (Continued)

(58) Field of Classification Search
CPC .... H01M 2/0275; H01M 2/0287; H01M 2/08; H01M 2/02; H01M 10/0525; H01M 2/06; H01M 2/0212
See application file for complete search history.

(56) References Cited

U.S. PATENT DOCUMENTS

| | | | |
|---|---|---|---|
| 2003/0064286 A1* | 4/2003 | Yoshida ................ | H01M 2/021 429/184 |
| 2004/0038126 A1* | 2/2004 | Gu ........................ | H01M 2/021 429/162 |

(Continued)

FOREIGN PATENT DOCUMENTS

| | | |
|---|---|---|
| CN | 1767228 A | 5/2006 |
| CN | 103378316 A | 10/2013 |

(Continued)

OTHER PUBLICATIONS

International Search Report (PCT/ISA/210) issued in PCT/KR2015/001310, dated May 14, 2015.

(Continued)

*Primary Examiner* — Sarah A. Slifka
*Assistant Examiner* — Aaron J Greso
(74) *Attorney, Agent, or Firm* — Birch, Stewart, Kolasch & Birch, LLP

(57) ABSTRACT

Disclosed herein is a battery cell configured such that an electrode assembly having a positive electrode/separator/negative electrode structure is received in an electrode assembly receiving part formed in a pouch-type battery case in a sealed state together with an electrolyte, wherein the battery case is provided with sealed parts, formed by ther- (Continued)

mally welding the outer edge of the battery case in the state in which the electrode assembly is received in the battery case together with the electrolyte, one or more recesses are formed in opposite side sealed parts adjacent to an upper end sealed part, at which electrode terminals are located, and/or a lower end sealed part in a state in which the recesses are formed from outsides of the side sealed parts toward a vertical middle axis of the battery cell so as to prevent wrinkles from being formed in the sealed parts of the battery case when the battery cell is bent, and portions of the side sealed parts in which the recesses are located are sealed at a higher sealing temperature than the remaining portions of the side sealed parts.

20 Claims, 7 Drawing Sheets

(51) Int. Cl.
 H01M 2/02 (2006.01)
 H01M 10/0525 (2010.01)
(52) U.S. Cl.
 CPC ............... H01M 2/06 (2013.01); H01M 2/08 (2013.01); H01M 10/0525 (2013.01)

(56) References Cited

U.S. PATENT DOCUMENTS

| | | |
|---|---|---|
| 2006/0051658 A1 | 3/2006 | Otohata et al. |
| 2006/0093905 A1 | 5/2006 | Kim |
| 2011/0076529 A1 | 3/2011 | Mizuta et al. |
| 2011/0123844 A1 | 5/2011 | Bhardwaj et al. |
| 2012/0058387 A1 | 3/2012 | Ahn |
| 2012/0202101 A1* | 8/2012 | Ueda ..................... H01M 2/021 429/127 |
| 2014/0272488 A1 | 9/2014 | Kim et al. |

FOREIGN PATENT DOCUMENTS

| | | | | |
|---|---|---|---|---|
| JP | 2002-056835 | * | 2/2002 | .............. H01M 2/02 |
| JP | 2002-56835 A | | 2/2002 | |
| JP | 2003-462384 | * | 3/2003 | .............. H01M 2/18 |
| JP | 2005-18990 A | | 1/2005 | |
| JP | 2005-116235 A | | 4/2005 | |
| JP | 2005-222872 A | | 8/2005 | |
| JP | 2006-93120 A | | 4/2006 | |
| JP | 2004-055290 A | | 2/2009 | |
| KR | 10-2009-0016279 A | | 2/2009 | |
| KR | 10-2012-0022385 A | | 3/2012 | |
| KR | 10-1294259 B1 | | 8/2013 | |

OTHER PUBLICATIONS

Extended European Search Report dated Jun. 20, 2017, for European Application No. 15749553.2.

* cited by examiner

[FIG. 1]
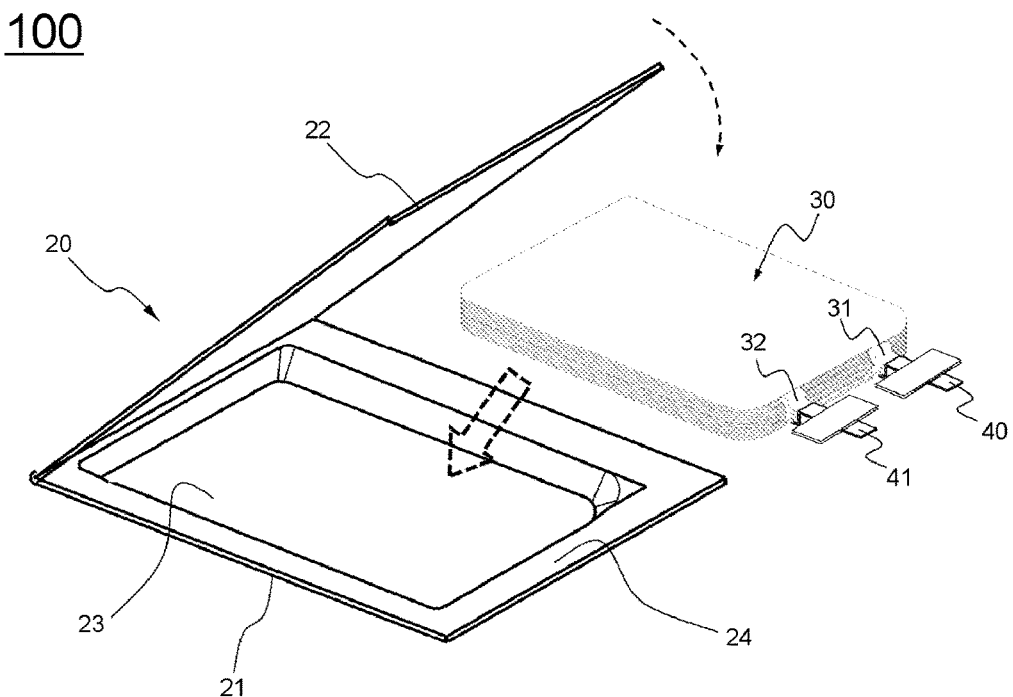

[FIG. 2]
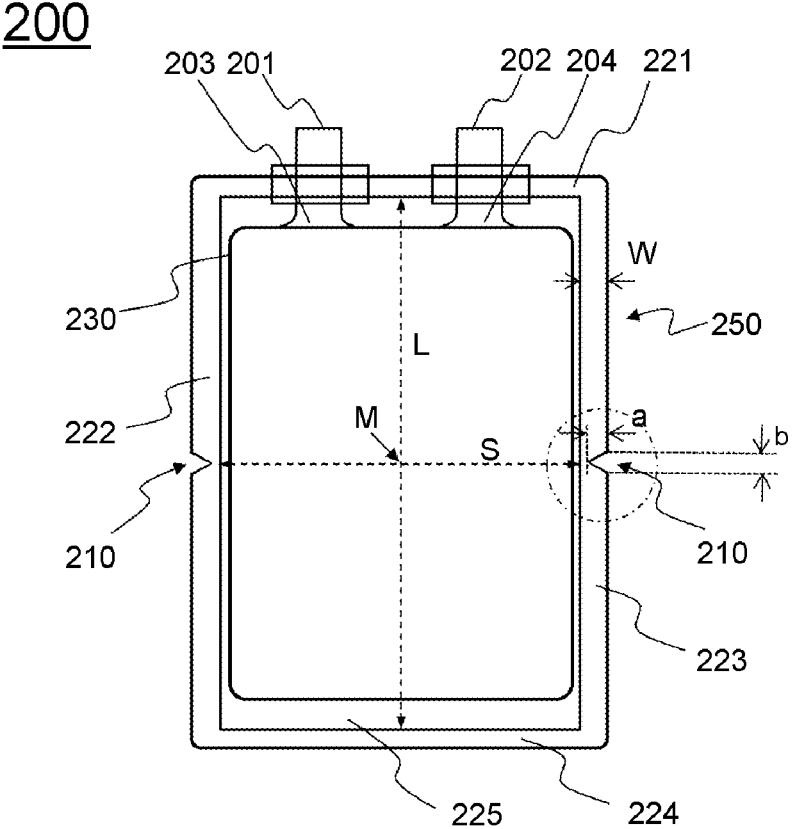

【FIG. 3】
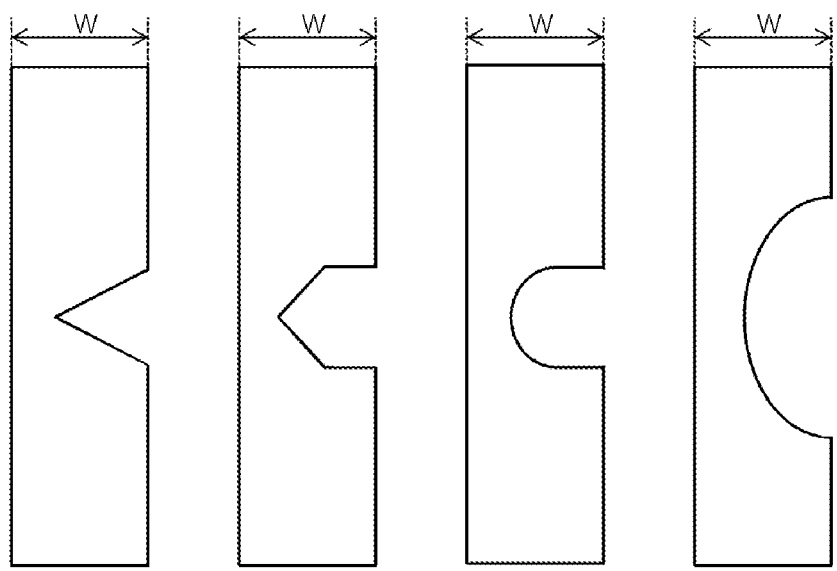

[FIG. 4]
300
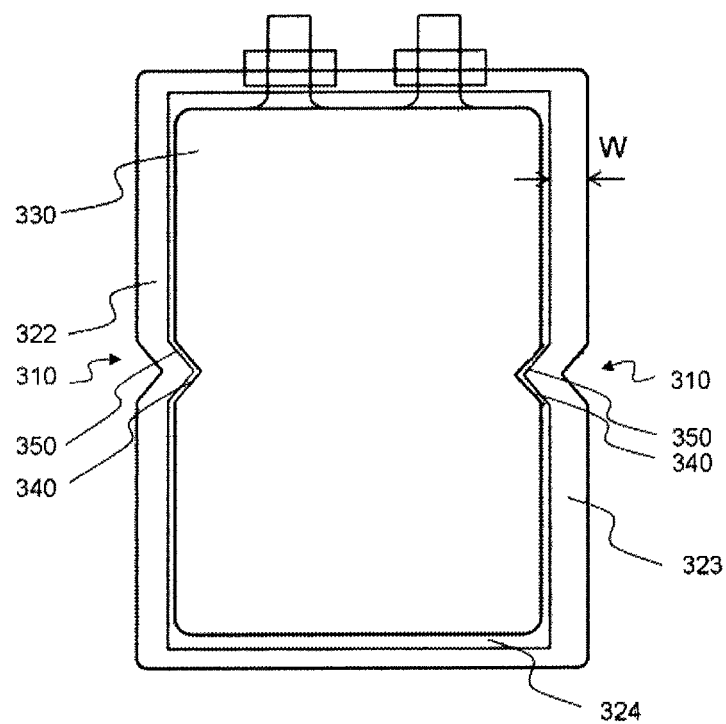

[FIG. 5]
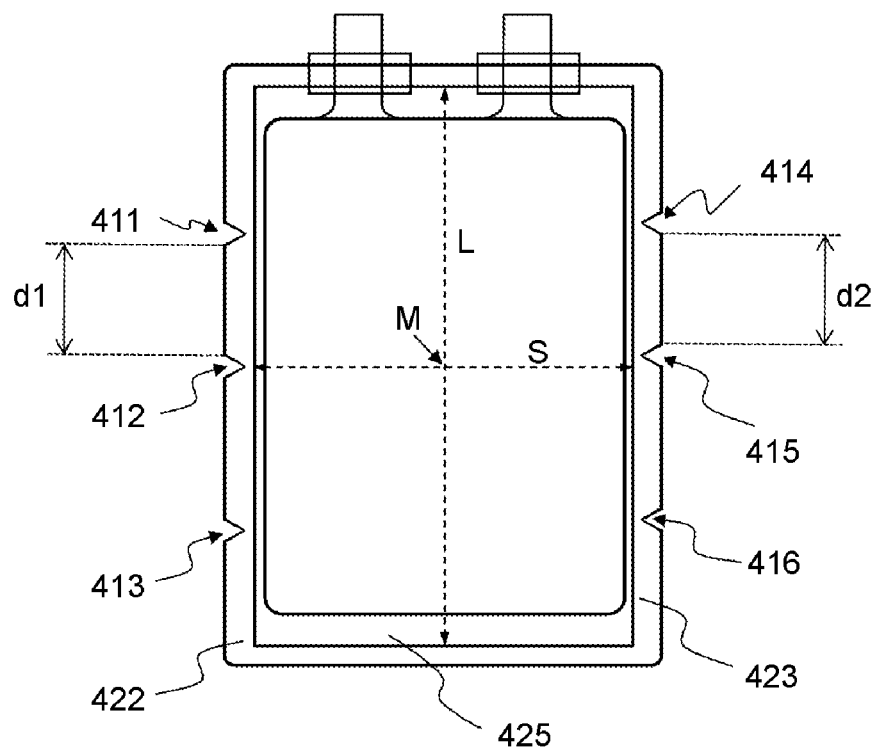

[FIG. 6]
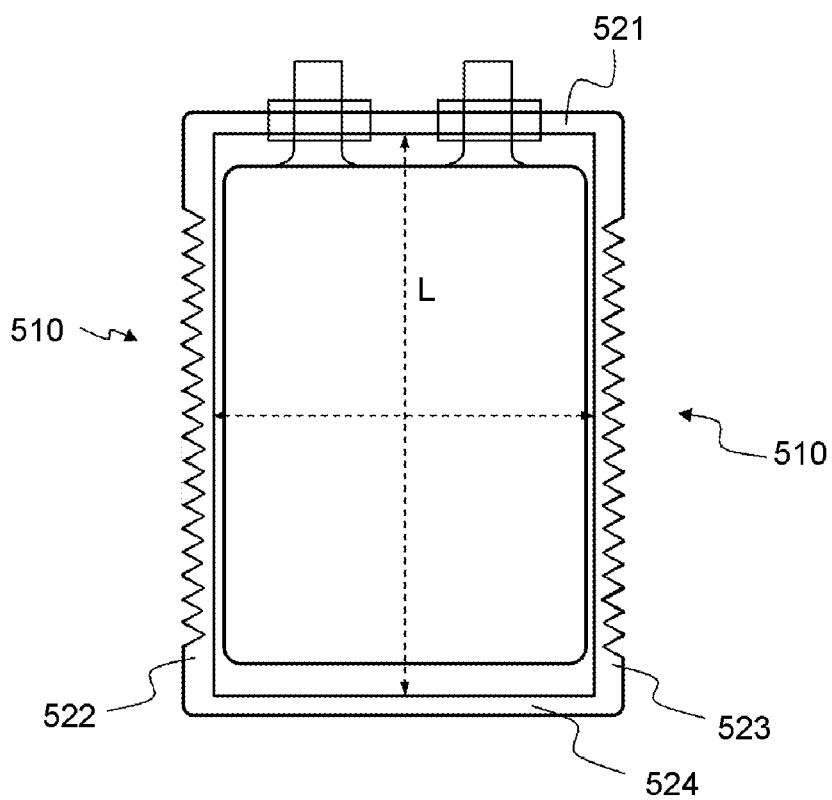

[FIG. 7]
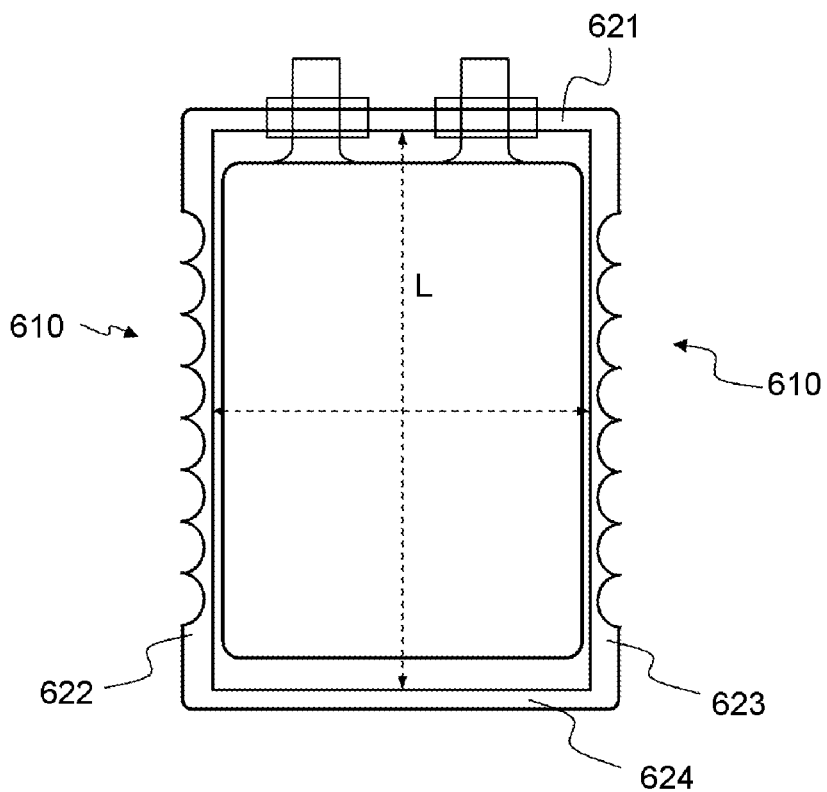

POUCH-TYPE SECONDARY BATTERY INCLUDING SEALED PART HAVING RECESS

CROSS REFERENCE TO RELATED APPLICATIONS

This application is the National Phase of PCT International Application No. PCT/KR2015/001310, filed on Feb. 10, 2015, which claims priority under 35 U.S.C. 119(a) to Patent Application No. 10-2014-0017281, filed in the Republic of Korea on Feb. 14, 2014, all of which are hereby expressly incorporated by reference into the present application.

TECHNICAL FIELD

The present invention relates to a pouch-type secondary battery including a sealed part having a recess.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

In terms of the shape of batteries, the demand for prismatic secondary batteries or pouch-type secondary batteries, which are thin enough to be applied to products, such as mobile phones, is very high. In terms of the material for batteries, meanwhile, the demand for lithium secondary batteries, such as lithium ion batteries and lithium ion polymer batteries, which exhibit high energy density, discharge voltage, and output stability, is very high.

Based on the shape thereof, secondary batteries may be classified into a cylindrical battery cell, a prismatic battery cell, and a pouch-type battery cell. Among these kinds of secondary batteries, much interest is currently focused on the pouch-type battery cell, which can be stacked with high integration, has high energy density per unit weight, can be manufactured at low cost, and can be easily modified.

FIG. 1 is an exploded perspective view typically showing a general structure of a conventional representative pouch-type secondary battery.

Referring to FIG. 1, a pouch-type secondary battery 100 includes a stacked type electrode assembly 30 having pluralities of electrode tabs 31 and 32 protruding therefrom, two electrode leads 40 and 41 respectively connected to the electrode tabs 31 and 32, and a battery case 40, in which the stacked type electrode assembly 30 is received in a sealed state such that the electrode leads 40 and 41 are partially exposed outward from the battery case 20.

The battery case 20 includes a lower case 21 having a concave receiving part 23, in which the stacked type electrode assembly is located, and an upper case 22 for covering the lower case 21 such that the stacked type electrode assembly 30 is received in the battery case 20 in a sealed state. The upper case 22 and the lower case 21 are connected to each other by thermal welding in the state in which the stacked type electrode assembly 30 is mounted therein to form a sealed part 24.

FIG. 1 shows a pouch-type battery cell configured to have a structure in which electrode terminals, constituted by the electrode tabs and the electrode leads connected to the electrode tabs, are formed at one end of the electrode assembly. Alternatively, a pouch-type battery cell configured to have a structure in which electrode terminals are formed at one end and the other end of an electrode assembly may be included in the scope of the present invention as an embodiment of the present invention.

In addition, FIG. 1 shows a pouch-type battery cell using a stacked type electrode assembly. Alternatively, a pouch-type battery cell using a wound type or jelly-roll type electrode assembly may be configured to have the above-described structure.

As shown in FIG. 1, the pouch-type battery cell is generally configured to have an approximately rectangular hexahedral shape. However, the size and thickness of electronic devices have been continually reduced so as to satisfy the desires of consumers. In order to maximize space utilization, therefore, it is necessary to provide various shapes of batteries corresponding to the shapes of the devices and, in addition, to efficiently utilize the internal space in each of the devices.

Particularly, in recent years, the design of the devices has played a very important role when consumers choose the devices. For this reason, various designs are provided in place of a flat type design based on high productivity. For example, electronic devices, such as mobile phones and laptop computers, may be designed such that the devices can be curved in an ergonomic manner. For example, the sides of a smart phone may be curved so as to be easier to grip, and a flexible display device may be curved or bent. That is, the flexible display device may be manufactured to have various shapes.

In the case in which a battery cell or battery pack configured to have a rectangular hexahedral shape is mounted in a device designed so as to have such curved parts or a device that can be curved, however, the efficiency of utilization of the space in the device may be lowered. In recent years, therefore, it has been required for the battery cell to be flexible such that the battery cell can be easily mounted in devices configured to have various kinds of designs.

Therefore, there is a high necessity for technology that is capable of solving problems that may occur when the battery cell is bent while solving the above problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, in the case in which recesses are formed in the sealed parts of a battery case and the portions of the sealed parts in which the recesses are formed are sealed at a higher sealing temperature than the remaining portions of the sealed parts, as will be described hereinafter, it is possible to prevent wrinkles from being formed in the sealed parts of the battery case, when the battery cell is deformed, and it is possible to effectively prevent the leakage of an electrolyte even though the width of the sealed parts is narrow, thereby securing the safety of the battery cell. The present invention has been completed based on these findings.

Technical Solution

In accordance with one aspect of the present invention, the above and other objects can be accomplished by the provision of a battery cell configured such that an electrode assembly having a positive electrode/separator/negative electrode structure is received in an electrode assembly receiving part formed in a pouch-type battery case in a sealed state together with an electrolyte, wherein the battery case is provided with sealed parts, formed by thermally welding the outer edge of the battery case in the state in which the electrode assembly is received in the battery case together with the electrolyte, one or more recesses are formed in opposite side sealed parts adjacent to an upper end sealed part, at which electrode terminals are located, and/or a lower end sealed part in the state in which the recesses are formed from outsides of the side sealed parts toward a vertical middle axis of the battery cell so as to prevent wrinkles from being formed in the sealed parts of the battery case when the battery cell is bent, and portions of the side sealed parts in which the recesses are located are sealed at a higher sealing temperature than the remaining portions of the side sealed parts.

That is, in the battery cell according to the present invention, the recesses are formed in the side sealed parts of the pouch-type battery case. When the battery cell is deformed so as to be easily mounted in various kinds of devices, therefore, it is possible to prevent wrinkles from being formed in the sealed parts of the battery case, thereby preventing the increase in volume of the battery cell due to wrinkles and preventing the exposure of a metal layer of the battery case due to the repeated bending of portions in which wrinkles may be formed. Consequently, it is possible to secure the safety of the battery cell.

In addition, the portions of the side sealed parts in which the recesses are formed are sealed at a higher sealing temperature than the remaining portions of the side sealed parts. Consequently, the portions of the side sealed parts in which the recesses are formed may be more securely welded even though the width of the sealed parts is narrow due to the recesses formed in the sealed parts, thereby effectively preventing the leakage of an electrolyte. Consequently, it is possible to provide a battery cell that is easily deformable and to secure the safety of the battery cell.

The battery cell according to the present invention may be deformed so as to be easily mounted in various kinds of devices. The portions of the battery cell at which the battery cell is bent are not particularly restricted. Specifically, the battery cell may be bent about the recesses, formed in the sealed parts of the battery case.

Consequently, the recesses may be formed in the portions of the battery cell that may be most frequently deformed. Specifically, the recesses may be formed in portions of the side sealed parts located on a horizontal axis extending through the middle of the electrode assembly receiving part.

In the case in which the recesses are formed in the portions of the battery cell that can be bent, as described above, it is possible to maximally prevent wrinkles from being formed in the sealed parts of the battery case when the battery cell is deformed. As a result, it is possible to prevent the increase in volume of the battery case and to secure the safety of the battery cell.

In a concrete example, a plurality of recesses may be formed in each of the opposite side sealed parts. Specifically, two or more recesses may be formed in each of the opposite side sealed parts. In order to prevent wrinkles from being formed in the battery cell when the battery cell is bent, the same number of recesses may be formed in each of the opposite side sealed parts.

Meanwhile, the battery cell is not bent only about the horizontal axis extending through the middle of the electrode assembly receiving part. For this reason, recesses may be formed in portions of the side sealed parts spaced apart from the horizontal axis. Consequently, it is possible to effectively prevent wrinkles from being formed in the battery cell irrespective of the position at which the battery cell is bent.

In addition, the battery cell may be bent parallel to the horizontal axis extending through the middle of the electrode assembly receiving part, and the recesses may be formed in portions of the left side sealed part and the right side sealed part that are spaced apart from the horizontal axis extending through the middle of the electrode assembly receiving part by the same distance or different distances.

The shape of each of the recesses is not particularly restricted as long as it is possible for the recesses to maximally prevent wrinkles from being formed in the battery cell when the battery cell is deformed. Specifically, each of the recesses may have a polygonal or arc planar structure.

Specifically, the recesses may be formed from the outsides of the side sealed parts toward the vertical middle axis of the battery cell. Each of the recesses may be configured to have a triangular or pentagonal structure having a corner formed toward the electrode assembly receiving part. In addition, each of the recesses may be configured such that an arc is formed toward the electrode assembly receiving part. The arc may be configured such that the length of the arc in one of the horizontal and vertical directions is greater than the length of the arc in the other of the horizontal and vertical directions.

The recesses may be formed in the sealed parts such that each of the recesses has a depth a equivalent to 0.2 to 0.8 times the width W of a corresponding one of the sealed parts. In addition, the recesses may be formed in the sealed parts such that each of the recesses has a width b equivalent to 0.1 to 2 times the width W of a corresponding one of the sealed parts.

The depth a and the width b of each of the recesses is not particularly restricted as long as the depth a and the width b of each of the recesses are set within an appropriate range in consideration of the wrinkle preventing effects and the safety of the battery cell. If the depth a of each of the recesses is less than 0.2 times the width W of a corresponding one of the sealed parts or if the width b of each of the recesses is less than 0.1 times the width W of a corresponding one of the sealed parts, it is difficult to maximally prevent wrinkles from being formed in the battery cell when the battery cell is deformed, which is undesirable. On the other hand, if the depth a of each of the recesses is greater than 0.8 times the width W of a corresponding one of the sealed parts or if the width b of each of the recesses is greater than 2 times the width W of a corresponding one of the sealed parts, it is not possible to secure the safety of the battery cell because the width of the portions of the sealed parts in which the recesses are formed is reduced, which is also undesirable.

In a concrete example, two or more recesses may be successively arranged along at least one of the opposite side sealed parts in the state in which the recesses are adjacent to each other. In this case, it is possible to maximally prevent wrinkles from being formed in the battery cell even when several portions of the battery cell are deformed simultaneously.

The recesses are formed in the sealed parts, as described above. For this reason, the width of the portions of the side sealed parts in which the recesses are formed may be less than the width of the remaining portions of the side sealed parts in which no recesses are formed, with the result that the coupling strength of the narrow portions of the side sealed parts, which are formed by joining the upper case and the lower case of the battery case, may be reduced. In order to solve this problem, the portions of the side sealed parts in which the recesses are formed may be sealed at a higher sealing temperature than the remaining portions of the side sealed parts.

Specifically, a sealant layer constituting the battery case may be made of polypropylene, which has a melting point of 139° C. to 143° C., and a metal layer constituting the battery case may be made of aluminum. The thermal welding temperature may be appropriately set within a range in which the sealant layer can be melted within a short time while the breakage of the metal layer, i.e. the aluminum layer, is prevented.

In consideration of the above, the portions of the side sealed parts in which the recesses are located may be thermally welded at a thermal welding temperature 4° C. to 30° C. higher than the remaining portions of the side sealed parts. More specifically, the portions of the side sealed parts in which the recesses are located may be thermally welded at a thermal welding temperature 10° C. to 20° C. higher than the remaining portions of the side sealed parts. At this time, the remaining portions of the side sealed parts may be thermally welded at a thermal welding temperature of 160° C. to 200° C. More specifically, the remaining portions of the side sealed parts may be thermally welded at a thermal welding temperature of 170° C. to 195° C.

That is, the sealed parts may be thermally welded at a higher thermal welding temperature or a lower thermal welding temperature depending on the locations of the portions of the sealed parts, and the portions of the side sealed parts in which the recesses are located may be thermally welded at a higher thermal welding temperature such that the sealed parts have different coupling strengths depending on the locations of the portions of the sealed parts.

Meanwhile, in a concrete example, in order to prevent the reduction of the thermally welded surfaces of the sealed parts in which the recesses are formed, which may be relatively narrow, such that the safety of the battery case is further improved, recesses having the same shape as the recesses formed in the side sealed parts may be formed in portions of the outer surface of the electrode assembly that face the recesses formed in the side sealed parts.

In this case, recesses may also be formed in the receiving part of the battery case such that the receiving part of the battery case corresponds in shape to the electrode assembly. The recesses are formed in the receiving part of the battery case in order to prevent the thermally welded surfaces of the sealed parts from being reduced due to the recesses formed in the sealed parts.

In the battery cell according to the present invention, the pouch-type battery case, in which the electrode assembly is mounted, may be made of a laminate sheet comprising a resin layer, a metal layer, and a sealant layer. The electrode terminals may include a positive electrode terminal and a negative electrode terminal, which are located on the upper end sealed part. Alternatively, the positive electrode terminal may be located on the upper end sealed part, and the negative electrode terminal may be located on the lower end sealed part.

Specifically, the electrode terminals, i.e. the positive electrode terminal and the negative electrode terminal, may be oriented in the same direction or in opposite directions depending on how positive electrode current collectors and negative electrode current collectors constituting the electrode assembly are stacked. The directions in which the electrode terminals are oriented may be appropriately set in consideration of the shape and structure of the device to be used and the capacity of the battery cell. The electrode terminals may be constituted by electrode tabs connected to the electrode assembly and electrode leads connected to the electrode tabs. One end of each of the electrode terminals may be connected to a protection circuit module (PCM).

The battery cell according to the present invention may be a lithium secondary battery. Based on the type of an electrolyte, the lithium secondary battery may be classified as a lithium ion polymer battery having a gel type liquid electrolyte, a lithium ion battery having a normal liquid electrolyte, or a lithium polymer battery having a solid electrolyte. In particular, the lithium ion polymer battery (or the gel polymer battery) exhibits high safety attributable to a lower possibility of leakage than the normal liquid electrolyte. In addition, the thickness and weight of the lithium ion polymer battery may be greatly reduced. As a result, the lithium ion polymer battery has been increasingly used. The well-known structure and components of the lithium ion polymer battery, the lithium ion battery, or the lithium polymer battery are incorporated by reference.

In accordance with another aspect of the present invention, there is provided a method of manufacturing a battery cell having recesses formed in sealed parts of a pouch-type battery case.

In a concrete example, the method of manufacturing the battery cell may include (a) thermally welding portions of the outer edge of a battery case, excluding one end of the outer edge of the battery case, to seal the remaining portions of the outer edge of the battery case in the state in which an electrode assembly is mounted in an electrode assembly receiving part formed in the battery case, (b) injecting an electrolyte through the one end of the outer edge of the battery case, which has not been sealed, and thermally welding the one end of the outer edge of the battery case, and (c) forming recesses in opposite side sealed parts from the outsides of the opposite side sealed parts toward a vertical middle axis of the battery cell.

In another concrete example, the method of manufacturing the battery cell may include (a) forming recesses in opposite side sealed parts from the outsides of the opposite side sealed parts toward a vertical middle axis of the battery cell in the state in which an electrode assembly is mounted in an electrode assembly receiving part formed in a battery case, (b) thermally welding portions of an outer edge of the battery case, excluding one end of the outer edge of the battery case, to seal the remaining portions of the outer edge of the battery case, and (c) injecting an electrolyte through the one end of the outer edge of the battery case, which has not been sealed, and thermally welding the one end of the outer edge of the battery case.

More specifically, the step of injecting the electrolyte through the one end of the outer edge of the battery case, which has not been sealed, and thermally welding the one end of the outer edge of the battery case may include charging and discharging the battery cell after injecting the electrolyte to activate the battery cell, removing gas generated from the battery cell, and thermally welding the one end of the outer edge of the battery case.

In a concrete example, the step of removing the gas generated at the step of activating the battery cell may be performed in a vacuum state, and the pressure in a chamber therefor may be maintained at normal pressure after thermal welding, thereby improving the uniformity of the thermally welded resin layer.

In addition, the method of manufacturing the battery cell may further include cutting the battery case, having been sealed by applying heat and pressure through thermal welding.

In accordance with other aspects of the present invention, there are provided a battery module including the battery cell as a unit cell and a battery pack including the battery module.

In accordance with a further aspect of the present invention, there is provided a device including the battery pack as a power source.

Specifically, the battery pack may be used as a power source for a device requiring ability to withstand high temperature, a long cycle, and high rate characteristics, etc. A specific example of such a device may be selected from among a mobile device, such as a smart phone, a mobile phone, a laptop computer, a tablet PC, a watch, or glasses, a power tool driven by a battery-based motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, or a power storage system. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a conventional representative pouch-type secondary battery;

FIG. 2 is a see-through plan view showing a battery cell according to an embodiment of the present invention;

FIG. 3 is a partially enlarged view showing planar shapes of a recess shown in FIG. 2;

FIG. 4 is a see-through plan view showing a battery cell according to another embodiment of the present invention;

FIG. 5 is a see-through plan view showing a battery cell according to a further embodiment of the present invention;

FIG. 6 is a see-through plan view showing a battery cell having recesses, the number of which is different from the number of recesses formed in the battery cell of FIG. 5; and FIG. 7 is a see-through plan view showing a battery cell according to a modification of FIG. 6.

BEST MODE

Now, exemplary embodiments of the present invention will be described in detail with reference to the accompanying drawings. It should be noted, however, that the scope of the present invention is not limited by the illustrated embodiments.

FIG. 2 is a see-through plan view showing a battery cell 200 according to an embodiment of the present invention.

FIG. 2 shows a pouch-type battery cell configured to have a structure in which electrode terminals, constituted by electrode tabs and electrode leads connected to the electrode tabs, are formed at one end of an electrode assembly. Alternatively, a pouch-type battery cell configured to have a structure in which electrode terminals are formed at one end and the other end of an electrode assembly may be provided.

Referring to FIG. 2, the battery cell 200 according to the present invention is configured to have a structure in which an electrode assembly 230 is mounted in a pouch-type battery case 250 in the state in which the electrode assembly 230 is impregnated with an electrolyte (not shown). The battery case 250 is configured to receive the electrode assembly 230 in a sealed state such that two electrode leads 201 and 202, which are connected to pluralities of electrodes tabs 203 and 204, respectively, are partially exposed outward from the battery case 250. The battery case 250 includes a lower case having a concave receiving part 225, in which the electrode assembly is located, and an upper case for covering the lower case such that the electrode assembly 230 is received in the battery case 250 in a sealed state.

The battery case 250 is provided with sealed parts 221, 222, 223, and 224, which are formed by thermally welding the outer edge of the battery case 250 in the state in which the electrode assembly 230 is received in the battery case 250 together with the electrolyte. Recesses 210 are formed in the opposite side sealed parts 222 and 223, which are adjacent to the upper end sealed part 221, at which the electrode terminals are located, and the lower end sealed part 224, such that the recesses are formed from the outsides of the side sealed parts 222 and 223 toward the middle M of the battery cell 200.

Preferably, the battery cell is bent about the recesses 210. The recesses 210 are formed in the portions of the side sealed parts 222 and 223 located on a horizontal axis S of the receiving part 225 extending through the middle M of the electrode assembly, at which the horizontal axis S of the receiving part 225 intersects a vertical axis L of the receiving part 225. The recesses 210 are formed in the side sealed parts such that each of the recesses 210 has a depth a equivalent to 0.2 to 0.8 times the width W of a corresponding one of the side sealed parts. In addition, the recesses 210 are formed in the side sealed parts such that each of the recesses 210 has a width b equivalent to 0.1 to 2 times the width W of a corresponding one of the side sealed parts.

The shape of each of the recesses will be described in more detail with reference to FIG. 3, which is a partially enlarged view showing planar shapes of one of the recesses shown in FIG. 2.

Referring to FIG. 3, the recess is formed from the outside of a corresponding one of the side sealed parts toward the middle of the battery cell. The recess may have a polygonal planar shape, such as a triangular planar shape or a pentagonal planar shape, or a circular planar shape. The recess may have an appropriate size within the ranges of the depth a and the width b of the recess.

FIG. 4 is a see-through plan view showing a battery cell 300 according to another embodiment of the present invention.

Referring to FIG. 4, a recess 310 is formed in a left side sealed part 322 of a battery case, in which an electrode assembly 330 is mounted, and another recess 310 is formed in a right side sealed part 323 of the battery case. Specifically, the electrode assembly 330 is mounted in a receiving part 324 formed in the battery case.

Recesses 340 having the same shape as the recesses 310 are formed in the portions of the outer surface of the electrode assembly 330 that face the recesses 310 formed in the side sealed parts 322 and 323.

In addition, the receiving part 324 of the battery case may also have recesses 350 having a shape corresponding to the shape of the recesses 340 formed in the electrode assembly 330. The recesses are provided in the receiving part of the battery case in order to prevent thermally welded portions of the battery case from being narrowed due to the recesses formed in the sealed parts.

FIG. 5 is a see-through plan view showing a battery cell according to a further embodiment of the present invention.

Referring to FIG. 5, a plurality of recesses 411, 412, 413, 414, 415, and 416 is formed in a left side sealed part 422 and a right side sealed part 423 of a battery cell 400, in which an electrode assembly 330 is mounted. Of the recesses, the recesses 412 and 415, which are formed on a horizontal axis S of the receiving part 425 extending through the middle M of the electrode assembly, at which the horizontal axis S of the receiving part 425 intersects a vertical axis L of the receiving part 425, are formed at the same positions as in the battery cell of FIG. 2. The recesses 411 and 413 may be formed in the left side sealed part 422 such that the recesses 411 and 413 are spaced apart from the recess 412 by a predetermined distance d1, and the recesses 414 and 416 may be formed in the right side sealed part 423 such that the recesses 411 and 413 are spaced apart from the recess 415 by a predetermined distance d2.

The distances d1 and d2 may be equal to each other, or may be different from each other. Consequently, even in the case in which the battery cell is deformed at an angle relative to the horizontal axis of the receiving part, in which the electrode assembly is received, as well as in the case in which the battery cell is deformed parallel to the horizontal axis of the receiving part, wrinkles may be prevented from being formed in the battery cell.

FIG. 6 is a see-through plan typically view showing a battery cell having recesses, the number of which is greater than the number of recesses formed in the battery cell of FIG. 5, and FIG. 7 is a see-through plan view showing a battery cell according to a modification, which is different in the shape of recesses from the battery cell of FIG. 6.

Referring to FIG. 6, recesses 510 are successively formed along a left side sealed part 522 and a right side sealed part 523 of a battery cell 500 in the state in which the recesses 510 are formed from the outsides of the side sealed parts toward the vertical middle axis L of the battery cell 500.

The size of each of the recesses 510 may be appropriately set within the ranges of the depth a and the width b of the recess shown in FIG. 2. The recesses 510 may be successively arranged from the upper ends of the side sealed parts 522 and 523 connected to an upper end sealed part 521 to the lower ends of the side sealed parts 522 and 523 connected to a lower end sealed part 524. Alternatively, the recesses 510 may be successively arranged along a portion of each of the side sealed parts, or the recesses 510 may be divided into a plurality of groups arranged at predetermined intervals.

FIG. 7 typically shows a battery cell that is different in the shape of recesses from the battery cell of FIG. 6.

Referring to FIG. 7, recesses 610 are successively formed along a left side sealed part 622 and a right side sealed part 623 of a battery cell 600 in the state in which the recesses 610 are formed from the outsides of the side sealed parts toward the vertical middle axis L of the battery cell 600.

The size of each of the recesses 610 may be appropriately set within the ranges of the depth a and the width b of the recess shown in FIG. 2. The recesses may be successively formed in a wave shape. Alternatively, each of the recesses may be formed in various planar shapes, such as a polygonal planar shape or an oval planar shape, in addition to the triangular planar shape shown in FIG. 6.

In addition, the recesses 610 may be successively arranged from the upper ends of the side sealed parts 622 and 623 connected to an upper end sealed part 621 to the lower ends of the side sealed parts 622 and 623 connected to a lower end sealed part 624. Alternatively, the recesses 610 may be successively arranged along a portion of each of the side sealed parts, or the recesses 610 may be divided into a plurality of groups arranged at predetermined intervals.

In the battery cell according to the present invention, as described above, the recesses are formed in portions of the sealed parts of the battery case. When the battery cell is deformed, therefore, it is possible to maximally prevent wrinkles from being formed in the sealed parts of the battery case, thereby preventing the increase in volume of the battery cell. In addition, the portions of the side sealed parts in which the recesses are formed may be configured to have a relatively high sealing temperature, thereby effectively preventing the leakage of an electrolyte and thus securing the safety of the battery cell.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured such that recesses are formed in opposite side sealed parts of a battery case adjacent to an upper end sealed part, at which electrode terminals are located, and/or a lower end sealed part. When the battery cell is deformed, therefore, it is possible to prevent wrinkles from being formed in the sealed parts of the battery case, thereby preventing the increase in volume of the battery cell due to wrinkles and preventing the exposure of a metal layer of the battery case due to the repeated bending of portions in which wrinkles may be formed.

In addition, the portions of the side sealed parts in which the recesses are formed may be sealed at a higher sealing temperature than the remaining portions of the side sealed parts. Consequently, the portions of the side sealed parts in which the recesses are formed may be more securely welded even in the case in which the thermally welded surfaces of the sealed parts are narrow, thereby effectively preventing the leakage of an electrolyte and thus securing the safety of the battery cell.

The invention claimed is:

1. A battery cell configured such that an electrode assembly having a positive electrode/separator/negative electrode structure is received in an electrode assembly receiving part formed in a pouch-type battery case in a sealed state together with an electrolyte, wherein the battery case is provided with sealed parts, formed by thermally welding an outer edge of the battery case in a state in which the electrode assembly is received in the battery case together with the electrolyte, one or more recesses are formed in opposite side sealed parts adjacent to an upper end sealed part, at which electrode terminals are located, and/or a lower end sealed part in a state in which the recesses are formed from outsides of the side sealed parts toward a vertical middle axis of the battery cell so as to prevent wrinkles from being formed in the sealed parts of the battery case when the battery cell is bent, one or more recesses are formed in portions of an outer surface of the electrode assembly that face the recesses formed in the side sealed parts, the one or more recesses formed in portions of the outer surface of the electrode assembly having the same shape as the recesses formed in the side sealed parts, and portions of the side sealed parts in which the recesses are located are sealed at a higher sealing temperature than the remaining portions of the side sealed parts so that portions of the side sealed parts in which the recesses are formed have a higher coupling strength than the remaining portions of the side sealed parts.

2. The battery cell according to claim 1, wherein the battery case is made of a laminate sheet comprising a resin layer, a metal layer, and a sealant layer.

3. The battery cell according to claim 1, wherein the electrode terminals comprise a positive electrode terminal and a negative electrode terminal, which are located on the upper end sealed part.

4. The battery cell according to claim 1, wherein a positive electrode terminal, which is one of the electrode terminals, is located on the upper end sealed part, and a negative electrode terminal, which is the other of the electrode terminals, is located on the lower end sealed part.

5. The battery cell according to claim 1, wherein the battery cell is bent about the recesses, formed in the sealed parts.

6. The battery cell according to claim 1, wherein two or more recesses are formed in each of the opposite side sealed parts.

7. The battery cell according to claim 1, wherein the same numbers of recesses are formed in the opposite side sealed parts.

8. The battery cell according to claim 1, wherein the recesses are formed in portions of the side sealed parts located on a horizontal axis extending through a middle of the electrode assembly receiving part.

9. The battery cell according to claim 1, wherein the recesses are formed in portions of the side sealed parts spaced apart from a horizontal axis extending through a middle of the electrode assembly receiving part.

10. The battery cell according to claim 9, wherein the recesses are formed in portions of the opposite side sealed parts spaced apart from the horizontal axis by the same distance or different distances.

11. The battery cell according to claim 1, wherein each of the recesses has a polygonal or arc planar structure.

12. The battery cell according to claim 1, wherein the recesses are formed in the sealed parts such that each of the recesses has a depth (a) equivalent to 0.2 to 0.8 times a width (W) of a corresponding one of the sealed parts.

13. The battery cell according to claim 1, wherein the recesses are formed in the sealed parts such that each of the recesses has a width (b) equivalent to 0.1 to 2 times a width (W) of a corresponding one of the sealed parts.

14. The battery cell according to claim 1, wherein two or more recesses are successively arranged along at least one of the opposite side sealed parts in a state in which the recesses are adjacent to each other.

15. The battery cell according to claim 1, wherein the portions of the side sealed parts in which the recesses are located are thermally welded at a thermal welding temperature 5° C. to 30° C. higher than the remaining portions of the side sealed parts.

16. The battery cell according to claim 15, wherein the portions of the side sealed parts in which the recesses are located are thermally welded at a thermal welding temperature 10° C. to 20° C. higher than the remaining portions of the side sealed parts.

17. The battery cell according to claim 15, wherein the remaining portions of the side sealed parts are thermally welded at a thermal welding temperature of 160° C. to 200° C.

18. The battery cell according to claim 17, wherein the remaining portions of the side sealed parts are thermally welded at a thermal welding temperature of 170° C. to 195° C.

19. A method of manufacturing a battery cell according to claim 1, the method comprising:
  (a) thermally welding portions of an outer edge of a battery case, excluding one end of the outer edge of the battery case, to seal the remaining portions of the outer edge of the battery case in a state in which an electrode assembly is mounted in an electrode assembly receiving part formed in the battery case;
  (b) injecting an electrolyte through the one end of the outer edge of the battery case, which has not been sealed, and thermally welding the one end of the outer edge of the battery case; and
  (c) forming recesses in opposite side sealed parts from outsides of the opposite side sealed parts toward a vertical middle axis of the battery cell.

20. A method of manufacturing a battery cell according to claim 1, the method comprising:
  (a) forming recesses in opposite side sealed parts from outsides of the opposite side sealed parts toward a vertical middle axis of the battery cell in a state in which an electrode assembly is mounted in an electrode assembly receiving part formed in a battery case;
  (b) thermally welding portions of an outer edge of the battery case, excluding one end of the outer edge of the battery case, to seal the remaining portions of the outer edge of the battery case; and
  (c) injecting an electrolyte through the one end of the outer edge of the battery case, which has not been sealed, and thermally welding the one end of the outer edge of the battery case.

* * * * *